E. L. MATTHEWS.
BILL FILE.
No. 10,948. Reissued July 24, 1888.
Fig. I.
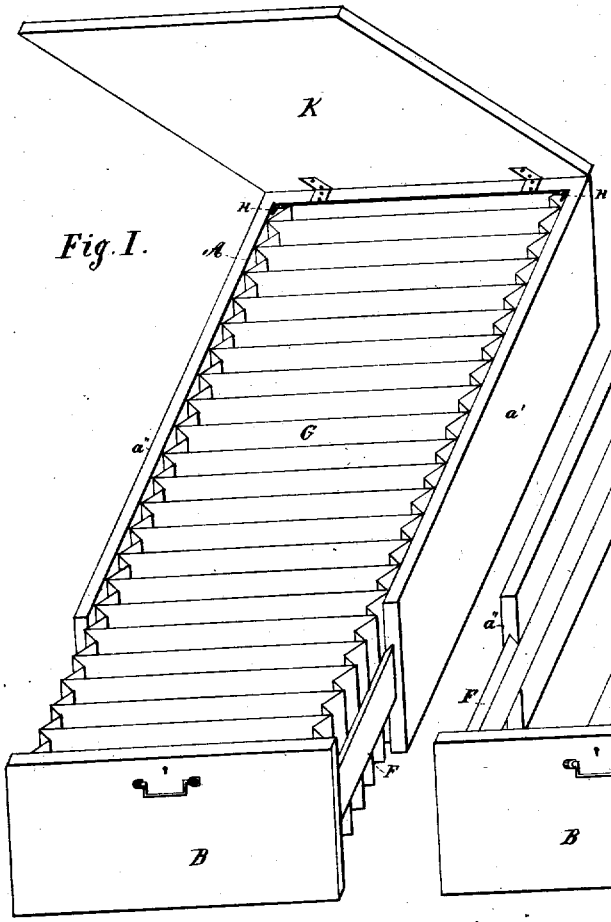
Fig. II.
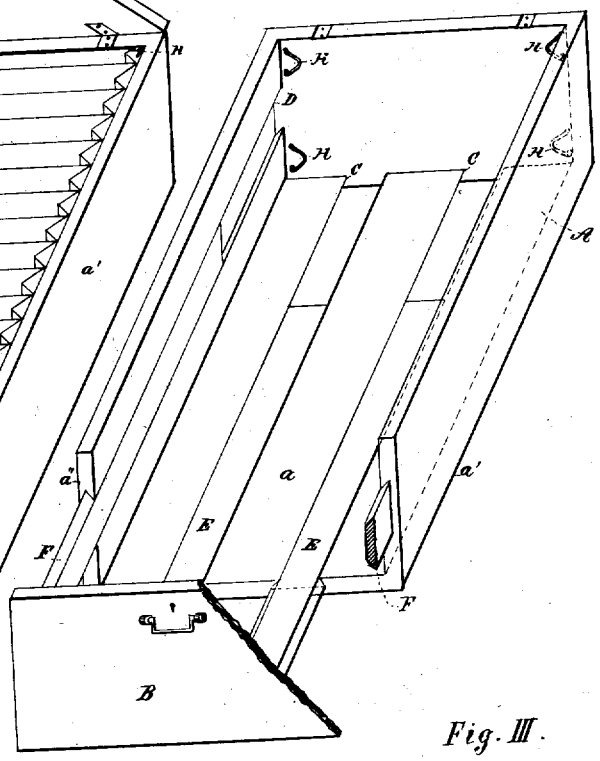
Fig. III.
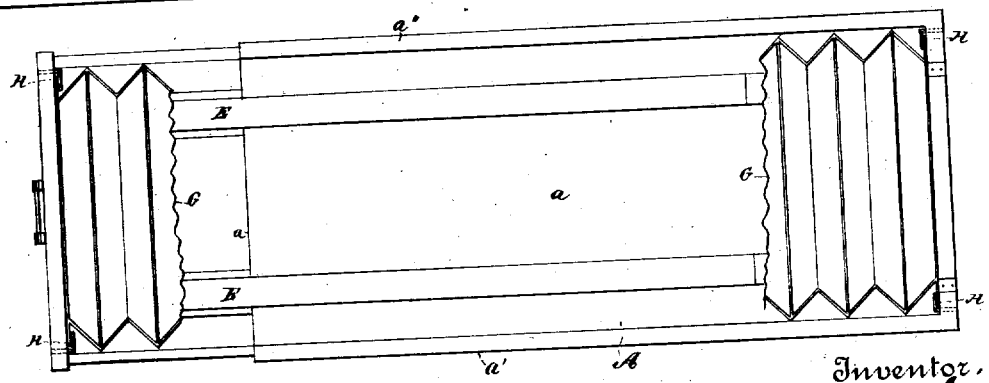
Witnesses.
A. H. Oschl.
Emma F. Elmore,
Inventor.
Edwin L. Matthews.
By his Attorney
Jas. F. Williamson.
N. PETERS, Photo-Lithographer, Washington, D. C.

UNITED STATES PATENT OFFICE.

EDWIN L. MATTHEWS, OF ADA, MINNESOTA.

BILL-FILE.

SPECIFICATION forming part of Reissued Letters Patent No. 10,948, dated July 24, 1888.

Original No. 382,716, dated May 15, 1888. Application for reissue filed June 9, 1888. Serial No. 276,748.

*To all whom it may concern:*

Be it known that I, EDWIN L. MATTHEWS, a citizen of the United States, and a resident of Ada, county of Norman, State of Minnesota, have invented a certain new and useful Improvement in Bill-Files, of which the following is a specification, reference being had to the accompanying drawings.

My invention relates to office files and file-cases; and it has for its object to provide a file which will give easy access to the papers when it is in use, and which will secure the papers in a closed case and protect them from displacement and dust when not in use. My construction for this purpose is simple, economical, and efficient, and consists, broadly, in providing an expansible file with an extensible case.

In the drawings, like letters referring to like parts, Figure I is a perspective view of my invention as it appears when the lid is raised and the case is extended. Fig. II is a perspective of the case as it appears with the file and the lid removed and a part of the front end and one of the slides broken away, and Fig. III is a plan of Fig. I with the lid and the central part of the file removed.

A is the body of the case, in shape like an ordinary oblong box or drawer with the front end removed.

B is the front end. In the bottom *a* and the sides *a′ a″* of the box A are dovetailed grooves C and D, adapted to receive and securely hold suitable slides. Of these grooves there may be any suitable number. I have shown two in the bottom and one on the interior surface of each side. To the end B are rigidly attached a set of beveled slides, E and F, adapted to fit the grooves C and D. Of these the slides E are attached to the lower edge of the end B and work in the grooves C, and the slides F are attached edgewise to the outer edges of the end B and work in the groove D. These grooves C and D and the slides E and F may be of a length equal to the entire length of the box or less, as desired. It is evident that the end B may be moved toward the body of the box A until it meets the front ends of the bottom *a* and the sides *a′* and *a″*; or it may be withdrawn in the opposite direction, extending the interior of the case by the skeleton formed out of the slides E and F. This construction constitutes an extensible file-case, the essential feature of which is a pair of telescoping parts. Within these telescoping parts is placed an expansible and compressible file, G, of any suitable construction. I have shown for the purpose a bellows file composed of a series of vertical card-board or wooden divisions connected at their ends by flexible material. If so desired, the lower edges of the division-pieces may also be connected by flexible material. These compartments may be marked with letters or numbers, or in any other suitable manner, according to the classification in hand. The opposite ends of this bellows file are secured in any suitable manner to the inner surfaces of the ends of the case. In the construction shown I use lugs H for the purpose, placing them in proper position in the ends of the case to grasp the outer edges of the end boards of the bellows file. This makes a detachable connection, and one file can be removed and another inserted at will.

K is a case-lid pivotally attached to the rear end of the box, and is of proper length to cover the entire case when contracted to its smallest compass.

The operation of the device is clear from the description already given. As one end of the bellows file is attached to the relatively fixed part A and the other end to the movable part B, it is evident that when the case is extended the file is expanded, and reversely. The file may thus be used until it is filled to its utmost capacity when compressed or the case is closed, and yet afford easy access to any paper by simply extending the case and expanding the file.

This is a device of great convenience and service in banks, offices, stores, and generally wherever it is necessary or desirable to keep a large number of classified papers in a small compass.

What I claim, and desire to secure by Letters Patent of the United States, is as follows:

1. The combination, with a pair of telescoping parts, constituting an extensible bill-file case, of an expansible bill-file secured within said telescoping parts, substantially as described.

2. The combination, with an extensible bill-file case, consisting, essentially, of a pair of telescoping parts, of a removable bellows bill-file detachably connected at its opposite ends to the end walls of the telescoping parts of said case, substantially as described.

3. In combination, the box-like body A, having its front end removed and provided with the grooves C D, the end B, provided with the slides E and F, working in said grooves, and the bellows file G, attached at one end to the relatively fixed part A and at the other to the relatively movable part B, as and for the purpose set forth.

4. In combination with a bill-file case, a bellows bill-file adapted to fit the same and having end boards provided with projecting outer edges, and hook-shaped lugs secured in the ends of said case in pairs, with their hook-shaped portions facing each other, and adapted to detachably secure the ends of the bellows file to the ends of the case, as and for the purpose set forth.

5. The extensible bill-file and expansible bill-file described, consisting of the box-like body A, having one end removed and provided with the grooves C and D, the movable end B, provided with the slides E and F, working in said grooves, the lid K, pivotally secured to the rear end of the body A, and the bellows file G, having its opposite ends secured by the lugs H, one end to the relatively fixed part A and the other to the movable part B, substantially as and for the purpose set forth.

EDWIN L. MATTHEWS.

In presence of—
W. H. MATTHEWS,
FRANK F. S. MILLER.